US010474903B2

(12) United States Patent
Tandon et al.

(10) Patent No.: US 10,474,903 B2
(45) Date of Patent: Nov. 12, 2019

(54) VIDEO SEGMENTATION USING PREDICTIVE MODELS TRAINED TO PROVIDE AESTHETIC SCORES

(71) Applicant: Adobe Inc., San Jose, CA (US)

(72) Inventors: Sagar Tandon, Ghaziabadv (IN); Abhishek Shah, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 15/880,077

(22) Filed: Jan. 25, 2018

(65) Prior Publication Data

US 2019/0228231 A1 Jul. 25, 2019

(51) Int. Cl.
*G06K 9/62* (2006.01)
*G06K 9/00* (2006.01)

(52) U.S. Cl.
CPC ..... *G06K 9/00765* (2013.01); *G06K 9/00255* (2013.01); *G06K 9/00718* (2013.01); *G06K 2009/00738* (2013.01)

(58) Field of Classification Search
CPC ........... G06K 9/00765; G06K 9/00255; G06K 9/00718; G06K 2009/00738
See application file for complete search history.

(56) References Cited

U.S. PATENT DOCUMENTS

| 2003/0123026 | A1* | 7/2003 | Abitbol | G02C 13/003 351/204 |
| 2008/0285860 | A1* | 11/2008 | Datta | G06K 9/00624 382/224 |
| 2015/0071547 | A1* | 3/2015 | Keating | G06K 9/46 382/195 |
| 2016/0070962 | A1* | 3/2016 | Shetty | G06F 16/7834 382/225 |

* cited by examiner

*Primary Examiner* — Samir A Ahmed
(74) *Attorney, Agent, or Firm* — Kilpatrick Townsend & Stockton LLP

(57) ABSTRACT

Systems and methods for segmenting video. A segmentation application executing on a computing device receives a video including video frames. The segmentation application calculates, using a predictive model trained to evaluate quality of video frames, a first aesthetic score for a first video frame and a second aesthetic score for a second video frame. The segmentation application determines that the first aesthetic score and the second aesthetic score differ by a quality threshold and that a number of frames between the first video frame and the second video frame exceeds a duration threshold. The segmentation application creates a video segment by merging a subset of video frames ranging from the first video frame to an segment-end frame preceding the second video frame.

20 Claims, 6 Drawing Sheets

VIDEO SEGMENTATION USING PREDICTIVE MODELS TRAINED TO PROVIDE AESTHETIC SCORES

TECHNICAL FIELD

This disclosure relates generally to video segmentation. More specifically, but not by way of limitation, this disclosure relates to using predictive models trained to provide aesthetic scores (e.g. a representation of subjective quality) to segment videos by using changes in quality to segment video.

BACKGROUND

Modern computing systems such as mobile devices enable video editing on an unprecedented scale. Mobile devices can record video and edit or segment the video into clips. For example, a mobile device can record video of multiple scenes, panning from scene to scene. The recorded video can be segmented and further edited at a later time. A computing device may be used to segment a video in order to re-arrange different scenes in the video or to remove scenes from the final video.

Performing video segmentation manually is cumbersome, especially with large videos. Manual segmentation involves a workflow that often requires watching the entire video and adding markers that indicates a start of a segment to every frame.

But existing solutions for automatic video segmentation, typically based on histogram analysis, cannot reliably and accurately segment video. These solutions create a histogram for each frame of video and analyze how the histogram changes over between frames. Histograms can be based on the tonal distribution or color distribution, e.g., the number of pixels with a given tone or color. Because histogram-based analysis fails to analyze the contents of the video, such analysis can result in lower quality of the final edited video because video can be over- or under-segmented and therefore require manual intervention.

For example, histogram-based video segmentation may miss subtle distinctions that should be categorized as different scenes. Automatic video segmentation may not be able to detect some scene changes, thereby forcing the user to manually segment the video. Additionally, automatic scene detection may over-aggressively segment a video, creating duplicate segments for one scene. For example, histogram-based algorithms may be inadvertently triggered by an object or a face in a scene and erroneously detect multiple scenes when only one scene exists.

Accordingly, existing solutions fail to effectively segment video content for reasons such as (but not limited to) those described above.

SUMMARY

Systems and methods are disclosed herein for segmenting video. A segmentation application executing on a computing device receives a video including video frames. The segmentation application calculates, using a predictive model trained to evaluate quality of video frames, a first aesthetic score for a first video frame and a second aesthetic score for a second video frame. The segmentation application determines that the first aesthetic score and the second aesthetic score differ by a quality threshold and that a number of frames between the first video frame and the second video frame exceeds a duration threshold. The segmentation application creates a video segment by merging a subset of video frames ranging from the first video frame to an segment-end frame preceding the second video frame.

These illustrative embodiments are mentioned, not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
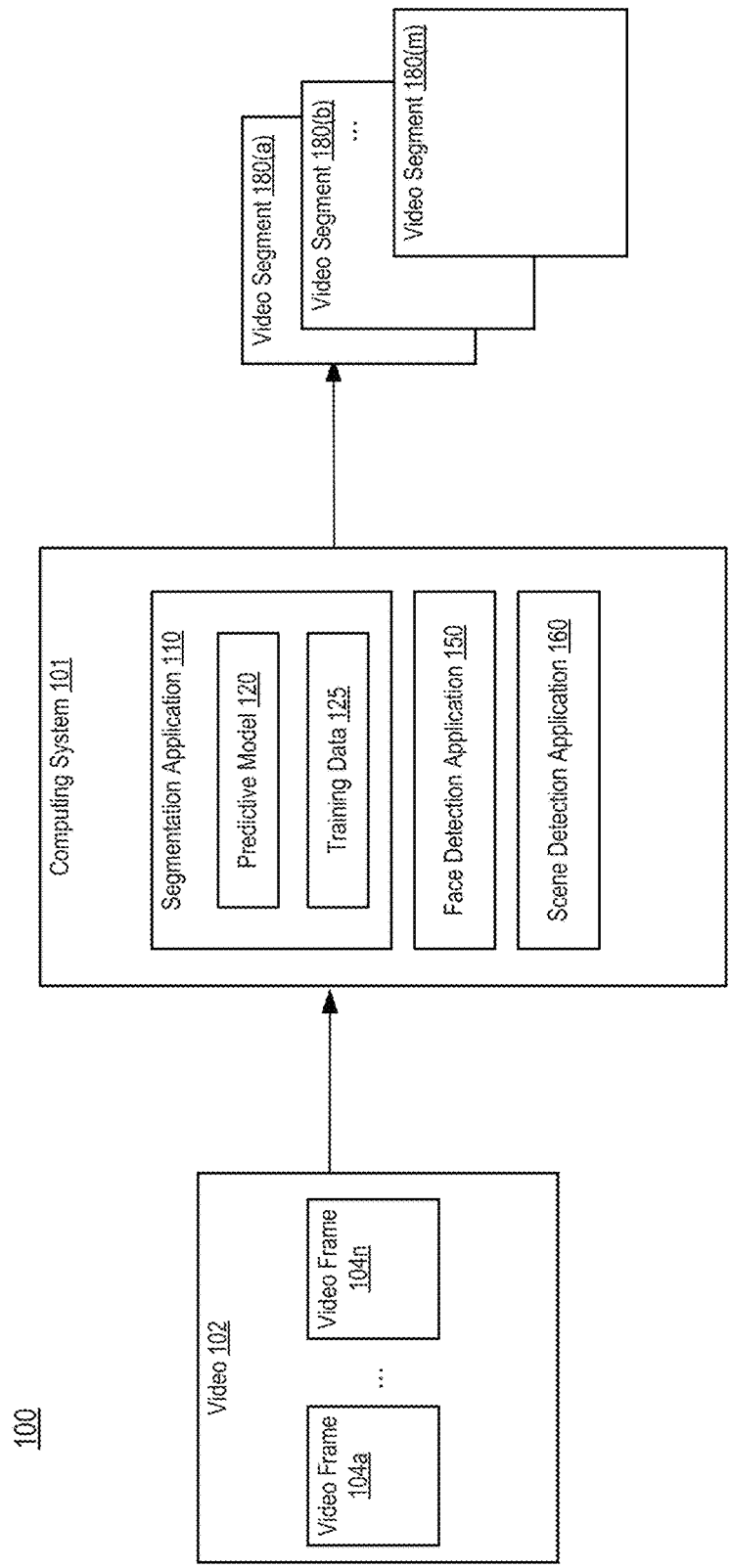
FIG. 1 depicts an example of a video segmentation environment, according to certain embodiments of the present disclosure.

Embodiments of the present disclosure include systems and methods for segmenting video using a predictive model trained to provide aesthetic scores. An aesthetic score is a numerical quantity that is derived from a subjective rating of the quality of the video in aspects such as depth of field, lighting, color harmony, object emphasis, or other factors. As discussed above, existing video-segmentation solutions may fail to adequately, segment a video, either through under-segmentation if a scene is not detected or over-segmentation if inappropriate triggers are used for segmentation. The aesthetic scores used in certain embodiments described herein address these deficiencies by using a trained predictive model to predict an aesthetic score for each frame. Segmentation is triggered by sufficient differences in the aesthetic score (avoiding under-segmentation from missed scene changes) and a sufficient duration between two video frames (avoiding over-segmentation within the same scene).

In an example, the segmentation application receives a video. A segmentation application provides each frame of video to the trained predictive model and obtains an aesthetic score for the frame. The predictive model generates the aesthetic score by comparing the video frame to similar video frames with which the model was trained. The segmentation application tracks the scores for all the frames in a video and derives various statistics, such as a minimum and a maximum aesthetic score.

Continuing with this example, the segmentation application analyzes the aesthetic scores for the video frames and determines that a quality threshold has been met between two frames that are separated by a duration threshold. The quality threshold helps ensure that the frames have changed significantly enough to segment the video. The quality threshold can be determined relative to the range of minimum to maximum aesthetic scores in the video. The duration threshold helps ensure that small, temporary changes such as a person walking into and out of the video are not used to trigger a segmentation. For example, if a video includes the Eiffel Tower, a normal circumstance of tourists walking in front of the camera should not generally trigger a video segmentation (e.g., generating a segment depicting the Eiffel Tower without tourists and a separate segment depicting the Eiffel Tower with tourists).

In an embodiment, the video segmentation is combined with scene detection or face detection to further improve the quality and effectiveness of the video segmentation. For instance, both scenes and faces are separately detected in a received video. The results of scene detection and face detection are combined in a post-processing step that combines all the video segments determined from the different methods, removes video segments that are too small, and merges segments based on an overall score derived from scores of the different methods. Accordingly, the system adjusts the video segmentation performed by the predictive model as necessary to increase the accuracy of the segmentation.

Embodiments described herein provide improvements to the technological field of video segmentation. More specifically, embodiments described herein provide superior video segmentation when compared to traditional methods such as histogram-based scene detection. Aesthetic-based video segmentation ensures that a scene is not split into two scenes unnecessarily and that two video frames that have similar histogram distributions are not erroneously included in the same video segment. In an example, a segmentation application operating on a computing device uses a trained predictive model to provide aesthetic scores for each video frame. The segmentation application determines, from the aesthetic scores, that a quality threshold has been met between the first and second video frames and that a duration threshold has been met between the first and second video frames. The segmentation application segments the video accordingly.

Turning now to the figures, FIG. 1 depicts a video segmentation environment, according to certain embodiments of the present disclosure. Video segmentation environment 100 includes computing system 101, video 102, and one or more video segments 180a-m. Computing system 101 provides improvement over traditional segmentation models by performing video segmentation according to aesthetic scores of received video frames.

Computing system 101 can also perform other methods of video segmentation in conjunction with aesthetic-based video segmentation. For example, computing system 101 can segment video according to faces detected in video frames or segment video using scene detection of the video frames by, for example, using traditional histogram-based methods. Histogram-based methods calculate a histogram for each video frame and then segment video based on the histogram distribution changing past a certain threshold. These additional methods, performed in conjunction with aesthetic-based video segmentation, can further improve the accuracy of aesthetic-based video segmentation.

Computing system 101 receives video 102 and generates one or more video segments 180a-m. Video 102, which can be stored video or live video, includes one or more video frames 104a-n. Computing system 101 provides the video segments 180a-m to a user interface or other device. Each video segment 180a-m created from video 102 includes one or more video frames.

Computing system 101 includes one or more processing devices that execute one or more of a segmentation application 110, a face detection application 150, and a scene detection application 160. Segmentation application 110 performs aesthetic-based video detection. For example, segmentation application 110 determines aesthetic scores for each video frame and uses the aesthetic scores to determine where to segment video 102.

Segmentation application 110 can be trained to perform segmentation according to aesthetic based scoring of the video frames. For example, predictive model 120 can be trained with training data 125. As depicted, predictive model 120 executes on computing system 101, but other configurations are possible. For example, predictive model 120 could execute on a remote server connected to computing system 101 via a network connection such as the Internet.

Predictive model 120 can be trained in a supervised manner. For example, training data 125 can include video frames or images, each with a corresponding training label that is an aesthetic score. Such aesthetic scores can be generated by a human, for example, by manually rating an image. From the training, predictive model 120 learns to determine an aesthetic score from each of video frames 104a-n from video 102. Segmentation application 110 in turn uses the aesthetic scores determined by predictive model 120 to determine how to segment video 102.

In an embodiment, computing system 101 can also perform face detection on video 102 using the face detection application 150. For example, face detection application 150 determines facial information for unique people depicted in each of the video frames 104a-n. The face detection application 150 decides to segment the video 102 based on changes in the facial information between frames.

In a further embodiment, computing system 101 can also perform scene detection on video 102. For example, scene detection application 160 detects changes in the scene within the video frames. Scene detection application 160 can use histogram-based methods of scene detection.

In embodiments in which computing system 101 uses one or more additional segmentation applications, such as face detection application 150 or scene detection application 160, computing system 101 processes multiple sets of video segments. Computing system 101 may perform a post-processing step in order to further combine or divide video segments. As discussed further herein, in the post-processing step, computing system 101 forms a complete list of the video segments output from each application and performs further analysis to determine the final segmentation of video segments 180a-n.

Figure 2:
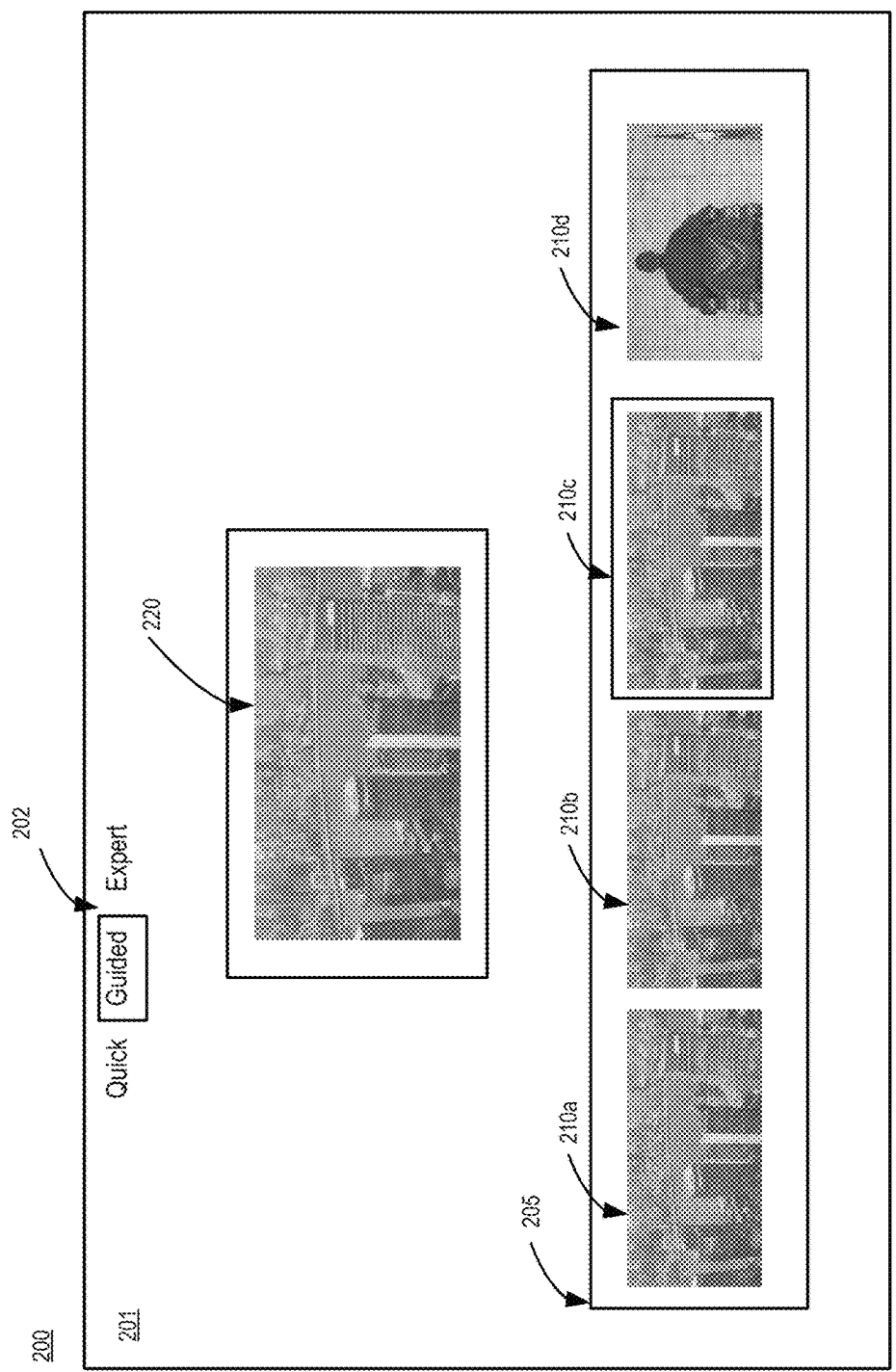
FIG. 2 depicts an example of a user interface for performing video segmentation in the video segmentation environment of FIG. 1, according to certain embodiments of the present disclosure.

FIG. 2 depicts an example of a user interface for a computing system for performing video segmentation, according to certain embodiments of the present disclosure. The user interface 200 may be implemented by computing system 101 or another computing system. User interface 200 includes workspace 201.

Workspace 201 can include video segments generated by computing system 101 using aesthetic-based video segmentation. Workspace 201 displays a video to be segmented such as the video 102. Workspace 201 also includes functions allowing a user to interact with a computing system 101. Workspace 201 includes a mode configurator 202, a video view 220, a timeline 205 including video segments 210a-d.

Mode configurator 202 can be configured in a number of different user modes. For example, as illustrated, mode configurator 202 is configured to execute in "guided" mode. Guided mode can represent a mode in which the computing system 101 provides a subset of operations, guided with steps made easy for the user. Mode configurator 202 can also be configured in "quick" mode which may provide further automation than in "guided mode," such as automatically suggesting video segments determined by computing system 101. Mode configurator 202 can also operate in "Expert" mode, which may cause computing system 101 to provide access to advanced features used by professional users.

Timeline 205 provides a time-based view of different video segments or frames. For example, earlier frames or segments are displayed towards the left of timeline 205 and later segments to the right of timeline 205. In some embodiments, computing system 101 configures the timeline 205 to provide finer or coarser granularity based on user's preferences.

As shown, timeline 205 shows four video frames 210a-d. Video view 220 shows a currently selected segment or frame from video 102, corresponding to video segment 210c. Video segments 210a-c depict near-identical or identical video frames, and video frame 210d differs from video frames 210a-c. Accordingly, computing system 101 may identify video frames 210a-c as one segment and video frame 210d as starting a new video segment.

Figure 3:
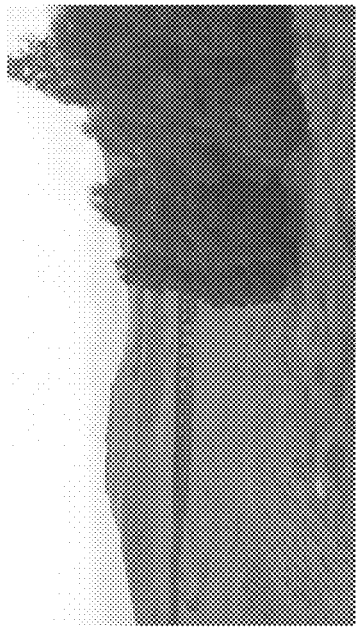
FIG. 3 depicts examples of two similar video frames that the video segmentation environment of FIG. 1 can identify as the same video segment, according to certain embodiments of the present disclosure.
Figure 3:
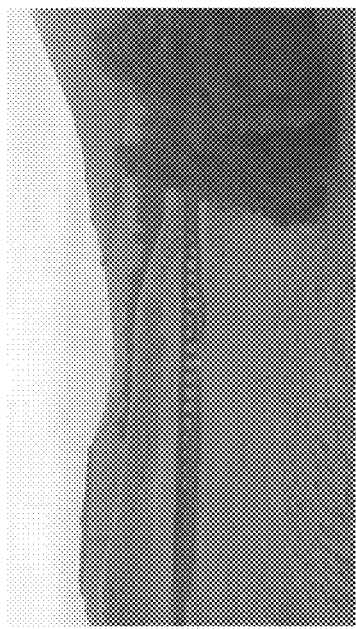

FIG. 3 depicts two similar video frames that can be identified by a segmentation application as the same video segment, according to certain embodiments of the present disclosure. As discussed, computing system 101 uses various methods including aesthetic scoring to determine video segments. FIG. 3 shows video frame 301 and video frame 302. Video frames 301 and 302 differ slightly. For example, the trees in video frame 301 are less prominent than the trees in video frame 302. The distinction between video frame 301 and video frame 302 could be the result of a camera panning to the right.

Some traditional video segmentation systems may erroneously determine that video frame 301 and video frame 302 are from different scenes, based on the slight difference in content between the frames. But a more sophisticated system, such as computing system 101 executing segmentation application 110, can determine that video frame 301 and video frame 302 are not different video segments, based on determining that video frame 301 and video frame 302 have a similar aesthetic score. Hence, segmentation application 110 segments video 102 based on a future video frame that corresponds to a different scene.

Figure 4:
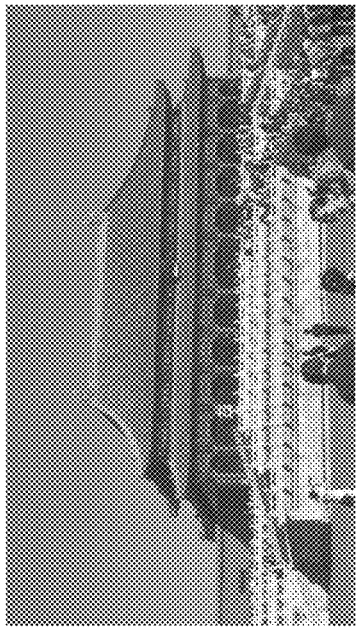
FIG. 4 depicts examples of two video frames that the video segmentation environment of FIG. 1 can identify as different video segments, according to certain embodiments of the present disclosure.
Figure 4:
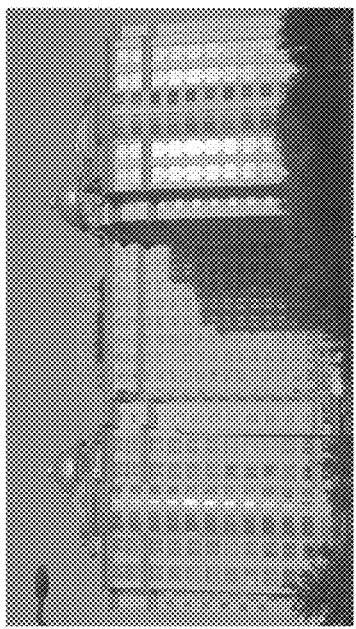

FIG. 4 depicts two video frames that can be identified by a segmentation application as different video segments, according to certain embodiments of the present disclosure. FIG. 4 shows video frame 401 and video frame 402. Video frames 401 and 402 are from different scenes and therefore should be identified as corresponding to two different segments. But some traditional video segmentation systems may erroneously determine that video frame 401 and video frame 402 are from the same scene. For example, histogram-based methods may result in this erroneous conclusion because video frame 401 and video frame 402 may have similar histogram distributions. As explained further herein, based on aesthetic scoring, computing system 101 can determine that video frame 401 and video frame 402 are from different scenes and segment the output video accordingly.

Figure 5:
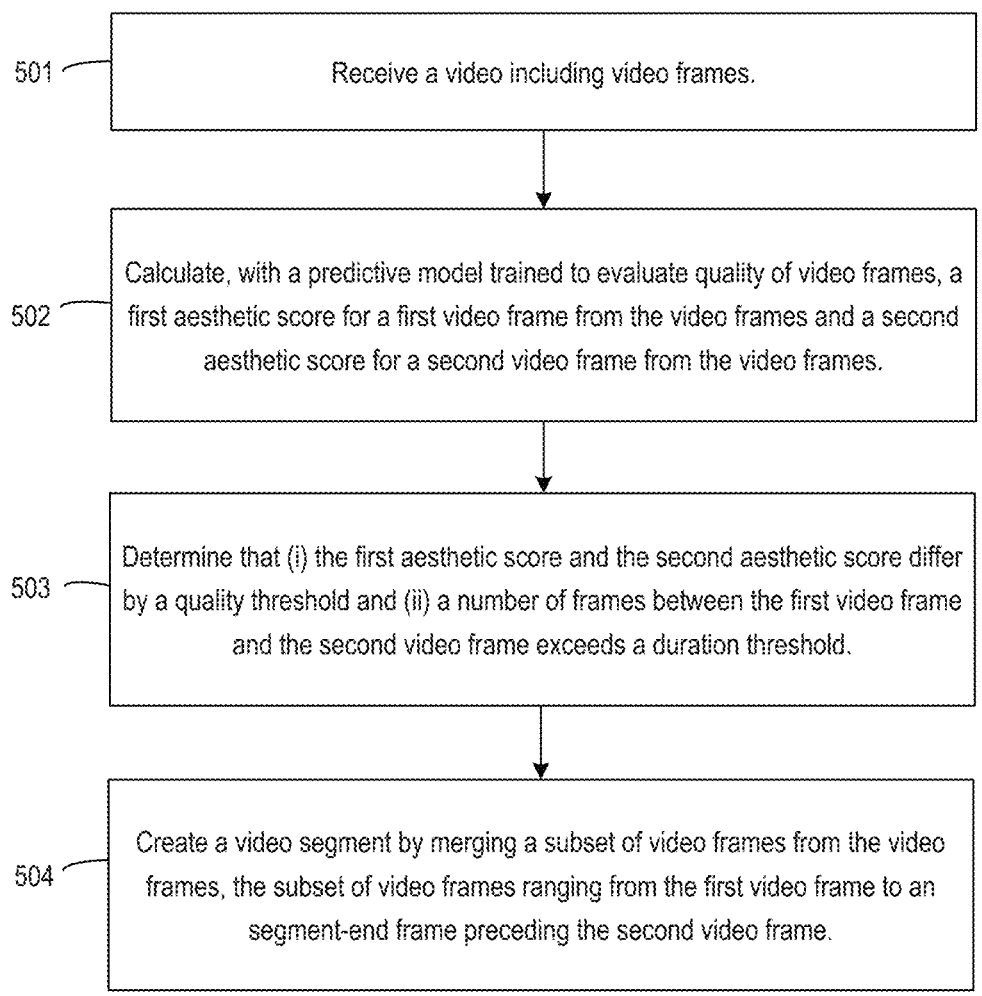
FIG. 5 depicts an example of a method of performing video segmentation using a predictive model trained to generate aesthetic scores, according to certain embodiments of the present disclosure.

For instance, FIG. 5 is a flowchart showing an example of a method 500 for performing video segmentation using a predictive model trained to generate aesthetic scores. In some embodiments, one or more computing devices implement operations depicted in FIG. 5 by executing suitable program code, such as the applications depicted in FIG. 1. For illustrative purposes, the method 500 is described with reference to certain examples depicted in the figures. Other implementations, however, are possible.

At block 501, method 500 involves receiving a video including video frames. For example, computing system 101 receives video 102 that includes video frames 104a-n. A video with n frames are represented by the frames $F_0 \ldots F_{n-1}$. One or more computing devices execute program code from the segmentation application 110 to implement block 501. In some embodiments, the segmentation application 110 obtains video 102 by communicating, via a data bus, suitable signals between a local non-transitory computer-readable medium (e.g., a memory device storing a video file) local to the computing system 101 and a processing device local to the computing system 101. In additional or alternative embodiments, the segmentation application 110 obtains input video 102 by communicating, via a data network, suitable signals between a remote computing system that includes the non-transitory computer-readable medium and a computing system 101 that executes the segmentation application 110.

At block 502, method 500 involves calculating, with a predictive model trained to evaluate quality of video frames, a first aesthetic score for a first video frame from the video frames and a second aesthetic score for a second video frame from the video frames. The predictive model provides an aesthetic score based on the model's previous training. For example, the score of a particular video frame may be similar to the score of a similar image in the training data with which the model was trained. One or more computing devices execute program code from the segmentation application 110 to implement block 502. For instance, segmentation application 110 determines, via the predictive model 120, an aesthetic score for each frame. Frame $F_i$ has aesthetic score of $I_i$.

The aesthetics score is defined such that a change in aesthetics score indicates a change in quality of the video. For example, the aesthetics score can quantify small changes between small numbers of frames. Additionally, the aesthetic score is designed such that the score can account for quickly-changing content such as action scenes or sports. In an embodiment, segmentation application 110 can choose to ignore small changes and to operate based on larger changes in aesthetic score.

The aesthetics score can be based on one or more components. For example, an aesthetic score can computed be based on color harmony, the balance of elements in a frame, whether content is interesting, depth of field, whether the light in the scene is interesting, which object is the emphasis of the scene, whether there is repetition, rule of thirds, vivid colors, or symmetry. As discussed further herein, such components may be determined by humans for images and provided to the training data 125.

In a further embodiment, segmentation application 110 can use a function of multiple aesthetic score components. For example, an aesthetic score may use color harmony and depth of field but ignore other components of the score. An aesthetic score can be implemented on any scale. An exemplary scale is a score between 0 and 1, where 0 is low aesthetic quality and 1 is good aesthetic quality.

At block 503, method 500 involves determining that (i) the first aesthetic score and the second aesthetic score differ by a quality threshold and (ii) a number of frames between the first video frame and the second video frame exceeds a duration threshold. The quality threshold represents a predefined difference in quality between two frames. A duration threshold represents a predefined distance between the frames, e.g., a specific number of frames between the first frame and the second frame.

One or more computing devices execute program code from the segmentation application 110 to implement block 503. For example, the segmentation application finds a range of frames from $F_i$ to $F_j$ where the difference in score between $I_i$ and $I_j$ is such that a quality threshold is met and a duration threshold based on the difference in frame number, i.e., $|j-i|$ is met. In some embodiments, performing segmentation based on both the quality threshold and the duration threshold ensures that a change in aesthetics is captured and that the change is consistent rather than short-lived. For example, short-lived changes in quality such as a sudden flash in a sky, a camera pan, or a person walking into and out of the frame may be ignored by the segmentation application 110. In this manner, consistent changes are more likely to trigger a new video segment.

A quality threshold can be calculated by different methods. The segmentation application 110 can determine statistics from which to derive a quality threshold. In one example, segmentation application 110 derives statistics from the aesthetic scores across multiple frames. For instance, for each frame $I_i$, segmentation application 110 computes the minimum aesthetic score for the frames in the set $I_{min}$ and the maximum aesthetic score for the frames in the set $I_{max}$. A quality threshold is calculated by the difference $I_i$ in score $|I_i-I_i|$ is >k, where $k=(I_{max}-I_{min})$. In some embodiments, segmentation application 110 receives a configuration value of k from a user (e.g., k=0.15).

A duration threshold can be also calculated by different methods. For instance, segmentation application 110 computes a frame-based duration threshold by calculating the difference in frames $|j-i|>M$. In some embodiments, segmentation application 110 receives a configuration value of M from a user (e.g., around 2.5 seconds or 75 frames of video at 30 frames/second).

At block 504, method 500 involves creating a video segment by merging a subset of video frames from the video frames, the subset of video frames ranging from the first video frame to an segment-end frame preceding the second video frame.

More specifically, segmentation application 110 determines two frames, $F_i$ identified as marking the start of a segment, and identified as marking the start of the next segment. Segmentation application 110 performs the segmentation by creating a segment starting at $F_i$ and ending one frame before and $F_j$, i.e., and $F_{j-1}$. Segmentation application 110 continues method 600 until the video frames 104a-n, have been processed. As a result, segmentation application 110 creates a list of video segments 180a-m.

As discussed, segmentation application 110 can work in conjunction with video segmentation performed by face detection application 150 and video segmentation performed by scene detection application 160 in order to further improve the video segmentation performed by aesthetic segmentation alone.

Figure 6:
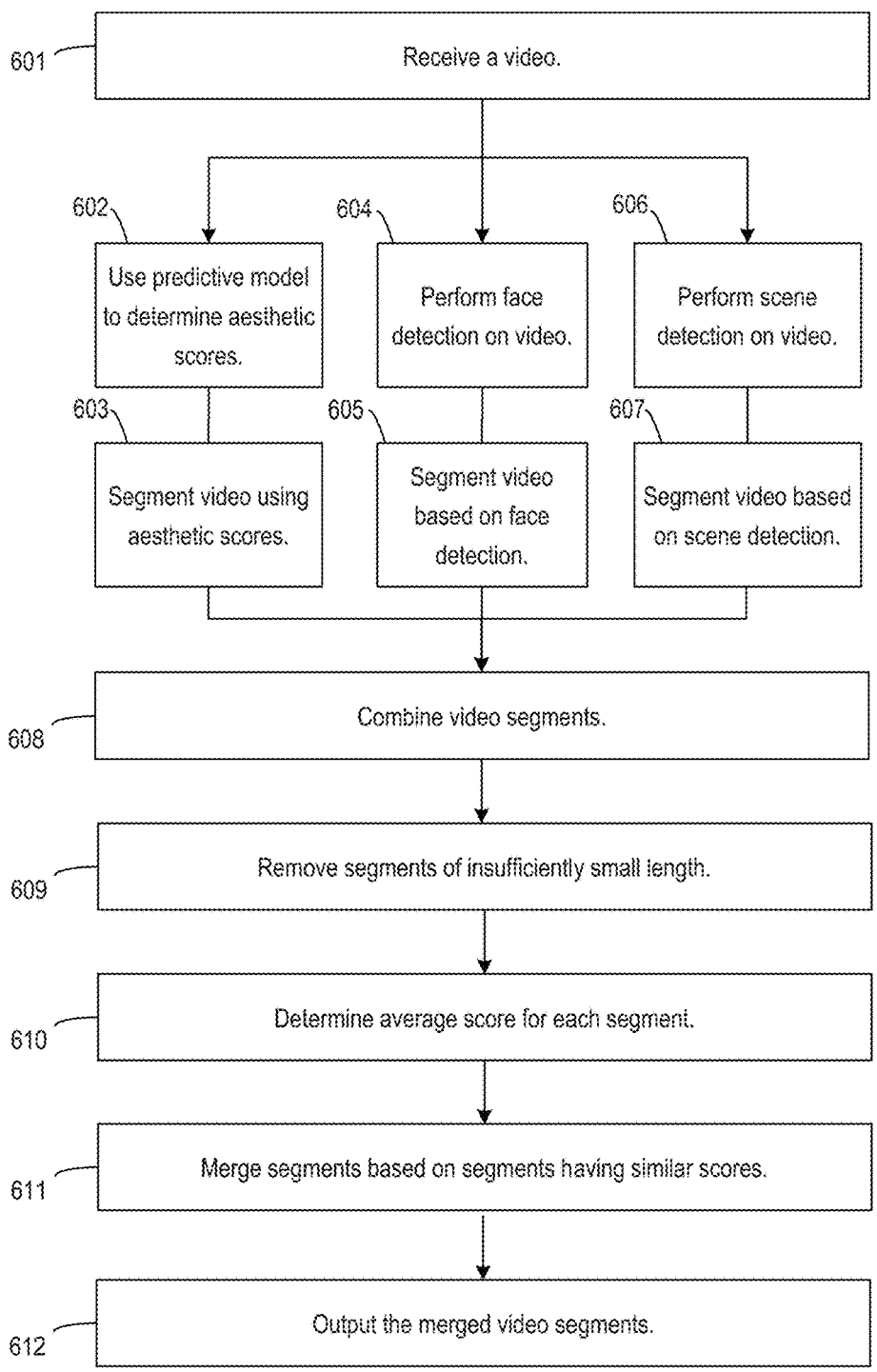
FIG. 6 depicts an example of a method of performing video segmentation using video segmentation, face detection, and scene detection.

FIG. 6 is a flowchart showing an example of a method 600 of performing video segmentation using video segmentation, face detection, and scene detection. In some embodiments, one or more computing devices implement operations depicted in FIG. 6 by executing suitable program code, such as the applications depicted in FIG. 1. For illustrative purposes, the method 600 is described with reference to certain examples depicted in the figures. Other implementations, however, are possible.

At block 601, method 600 involves receiving a video. For example, computing system 101 receives video 102 including video frames 104a-n in a manner similar to the description of block 510 in FIG. 5. Computing system 101 provides video 102 to the segmentation application 110, the face detection application 150, and the scene detection application 160. Each application can independently process video 102.

Blocks 602 and 603 relate to aesthetic-based video segmentation using segmentation application 110. At block 602, method 600 involves using a predictive model to determine aesthetic scores. One or more computing systems 101 execute program code from the segmentation application 110 to implement block 602. These operations can be similar to the operations for implementing blocks 502 and 503 of method 500. For example, the segmentation application 110 performs video segmentation of video 102 based on determining an aesthetic score for each of the video frames 104a-n, determining that a first frame and a second frame differ by a quality threshold and a number of frames between the first and second frames exceeds a duration threshold.

At block 603, method 600 involves segmenting video according to the aesthetic scores. One or more computing systems 101 execute program code from the segmentation application 110 to implement block 603. These operations can be similar to the operations for implementing block 504 of method 500.

Blocks 604 and 605 relate to face-detection based video segmentation using face detection application 150. At block 604, method 600 involves performing face detection on video. One or more computing systems 101 execute program code from the face detection application 150 to implement block 604. For instance, the face detection application 150 performs facial analysis on each of the video frames 104a-n. The facial analysis can include determining a detection score that represents the distinct faces in each frame. Face detection application 150 can analyze a person's combination of eyes, nose, mouth, or other facial features to determine a unique face for each frame.

Face detection application 150 analyzes how the faces in each frame have changed over time and merges adjacent frames that have the same or similar facial identity. For example, a third frame and a fourth frame of frames 104a-n have the same or similar facial intensity, indicating that the same faces are present in the third and fourth video frames. The face detection application 150 merges the third and fourth video frames. The face detection application 150 continues this process across all the video frames 104a-n.

In an embodiment, a facial quality threshold can be used to determine whether two frames should be merged. For example, for two frames to be merged together, the difference between the facial identity scores of each frame must be within a threshold. The threshold can be configured by a user.

At block 605, method 600 involves segmenting video based on the face detection. One or more computing systems 101 execute program code from the face detection application 150 to implement block 605. For example, if two video frames differ by a threshold facial identity, meaning that the facial information in the frames is sufficiently different, then method 600 segments the video based on the frames. Different methods are possible. For example, the face detection application 150 could segment video frames based on a particular face that has been in the frame for a long time leaving the frame, or a threshold number of new faces entering the frame for a threshold amount of time.

In some embodiments, face detection application 150 segments video based on prominent face changes. In one example, if a video changes from a view of a presenter to a view of an interviewee, face detection application 150 detects a new scene based on the change. If a threshold number of faces changes between two frames, the face detection application 150 determines that the change is sufficient to create a new video segment. These video segments are merged into an aggregate list of video segments at block 608.

By obtaining facial information on a frame-to-frame basis, face detection application 150 ensures that video segmentation is not performed for small changes in the number of faces in the video. Instead, segmentation is based on longer-term, consistent changes in the video. For example, in a video of a tourist area, multiple people may walk into and out of the photo, but the intended subject of the video such as a tourist attraction may stay constant. Based on the facial detection information, video segmentation is not performed for such facial changes in the video.

Following segmentation, the face detection application 150 can perform further processing. In one example, this processing includes merging consecutive frames having the same data (e.g., results such as number of faces, number of detected faces, etc.) into a list. In another example, this processing includes applying a duration threshold. For instance, if the duration of a given segment is less than a threshold duration (e.g., two seconds), then the segmentation application merges the segment with the previous segment in the list. Such a duration can be user configurable.

Following processing, the final face-detected video segments are merged into an aggregate list of video segments at block 608.

Blocks 606 and 607 relate to scene-based video segmentation using scene detection application 160. At block 606, method 600 involves performing scene detection on the video. Scene detection application 160 determines scenes from video 102. Scene detection application 160 can use various methods to determine scenes, for example, histogram-based methods. In such an embodiment, scene detection application 160 determines a histogram for each frame 104*a-n*. Scene detection application 160 analyzes the histograms for all the video frames 104*a-n* and determines whether any of the histograms have changed more than a threshold amount. A change of more than a threshold amount can indicate a new scene, and therefore a new segment.

At block 607, method 600 involves segmenting the video based on the scene detection. Scene detection application 160 segments the video frames 104*a-n* based on the detected scenes. For example, a first detected scene is placed in a first video segment, and a second detected scene is placed in a second video segment, and so on. These video segments are merged into an aggregate list of video segments at block 608.

At block 608, method 600 involves combining video segments from the various different segmentation methods. More specifically, the computing system 101 merges the output segments of segmentation application 110, face detection application 150, and scene detection application 160. Merging is performed such that the boundaries of the segments from each application are maintained. In an example, a video of duration 10 seconds can have aesthetic detection boundaries at 4 seconds and 8 seconds, facial detection boundaries at 5 seconds and 7 seconds, and scene detection boundaries at 7 seconds. The computing system 101 merges the segments such that the merged segments have boundaries at 4, 5, 7, and 8 seconds. The combined video segments are from 0-4 seconds, 4-5 seconds, 7-8 seconds, and 8-10 seconds.

Segmentation application 110 can also perform various post-processing steps. For example, at block 609, method 600 involves removing segments of insufficiently small length. Segmentation application 110 removes video segments that are less than a threshold length by combining such segments with larger segments. For example, if segments exist from 0 to 0.5 and from 0.5 to 1 seconds, and the duration threshold is set to 1 second, then segmentation application 110 merges the first segment from 0 to 0.5 seconds with the second segment from 0.5 to 1 seconds into one segment that is from 0 to 1 seconds in the video.

At block 610, method 600 involves determining an average score for each segment. An average score can be a metric that is a composite of an average aesthetic score for the segment, a score based on the facial identification of the faces in the segmentation, and a metric derived from histogram-based scene detection. Computing system 101 determines an average score for each segment and use the average scores for further segmentation or combination.

At block 611, method 600 involves merging segments that have similar scores. Segmentation application 110 determines video segments that have similar scores, indicating that such video segments are part of the same output segment 180*a-n*. In so doing, the segmentation application 110 combines the results of the segmentation application 110, face detection application 150, and scene detection application 160.

At block 612, method 600 involves outputting the merged video segments. For instance, the computing system 101 provides the merged video segments 180*a-n* to another application, or to a user interface such as user interface 200. From user interface 200, computing system 101 receives further instructions indicating further adjustments to the video segments 180*a-n*.

In various embodiments herein, an aesthetics score for each of the video frames 104*a-n* is determined using based on a predictive model. Predictive models can include machine learning models such as neural networks. In particular, deep convolutional neural networks may be used. Based on a query from segmentation application 110, predictive model 120 can find a similar image and base its score on the score of that image.

More specifically, predictive model 120 is trained using training data 125. The ranking of frame aesthetics can be directly modeled in the loss function of the neural network. The predictive model can incorporate joint learning of the attributes and image content information.

Training can be supervised. For example, the predictive model may be trained using a database of images and aesthetic scores. Determinations of aesthetic scores can be done by humans. For example, images provided to users charged with rating, or providing an aesthetic score, for each image. Scores can include sub-components for which a separate score is provided.

In embodiments, the data for each image rated by a particular human subject can be analyzed for intra-rater consistency. Additionally, a particular image can be provided to several different human raters. Such a normalization ensures that the database is robust with respect to different subjective judgements from different raters who may have different tastes.

The predictive model can be trained by logistic regression model. In such a model, the desired output of a set of parameters is the outcome of the relevance of a video. For example, a general equation can be:

$$\text{Ln}\left(\frac{P}{(1-P)}\right) = B_0 + B_1X_1 + B_2B_2 + \ldots$$

where P is the probability of outcome of the class, $X_1 \ldots X_N$ is are the input variables (features), and $B_0, B_1, \ldots$ are coefficients as determined by the logistic regression training. An example set of parameters for X can be the change of aesthetics score of frames with respect to time, the type of clip based on event (e.g., birthday, sports, tourist, nature, etc.), the type of clip based on content (e.g., people, places, animals, etc.), activity level in the clip and its segments (low, medium, or high), or lighting conditions (day, night, etc.).

As discussed, embodiments described herein perform video segmentation. Video segments determined by computing system 101 can be used to present segmented video options to a user via a user interface such as user interface 200. For example, computing system 101 can present segments automatically determined by using video segmentation in the timeline 205. A user may choose to accept or reject such a segmentation. In an embodiment, segmentation application 110 can automatically, i.e., without user input, segment or trim video 102 in accordance with video segments 180a-m.

Additionally, aesthetic-based video segmentation including segmentation in conjunction with face detection or scene detection can be used for a variety of additional applications. For example, computing system 101 can generate a video summary. A video summary can be a shorter version of the original video 102, with only the most interesting segments. For example, computing system 101 can rank the determined video segments 180a-m according to a criterion such as an aesthetic score. Segmentation application 110 can use those segments with the highest aesthetic score in a video summary. Similarly, segmentation application 110 can create a slideshow of key images by using key frames from the highest-ranked video segments.

In an embodiment, segmentation application 110 can be used to generate high quality images from the video frames. High quality images can be used, for example, for "candid moments" shown to the user. For example, using aesthetic-based filtering, segmentation application determines an aesthetic score for each of the video frames 104a-n. By ranking the scores, segmentation application 110 can determine the most aesthetically, pleasing frames and output those frames as images.

Figure 7:
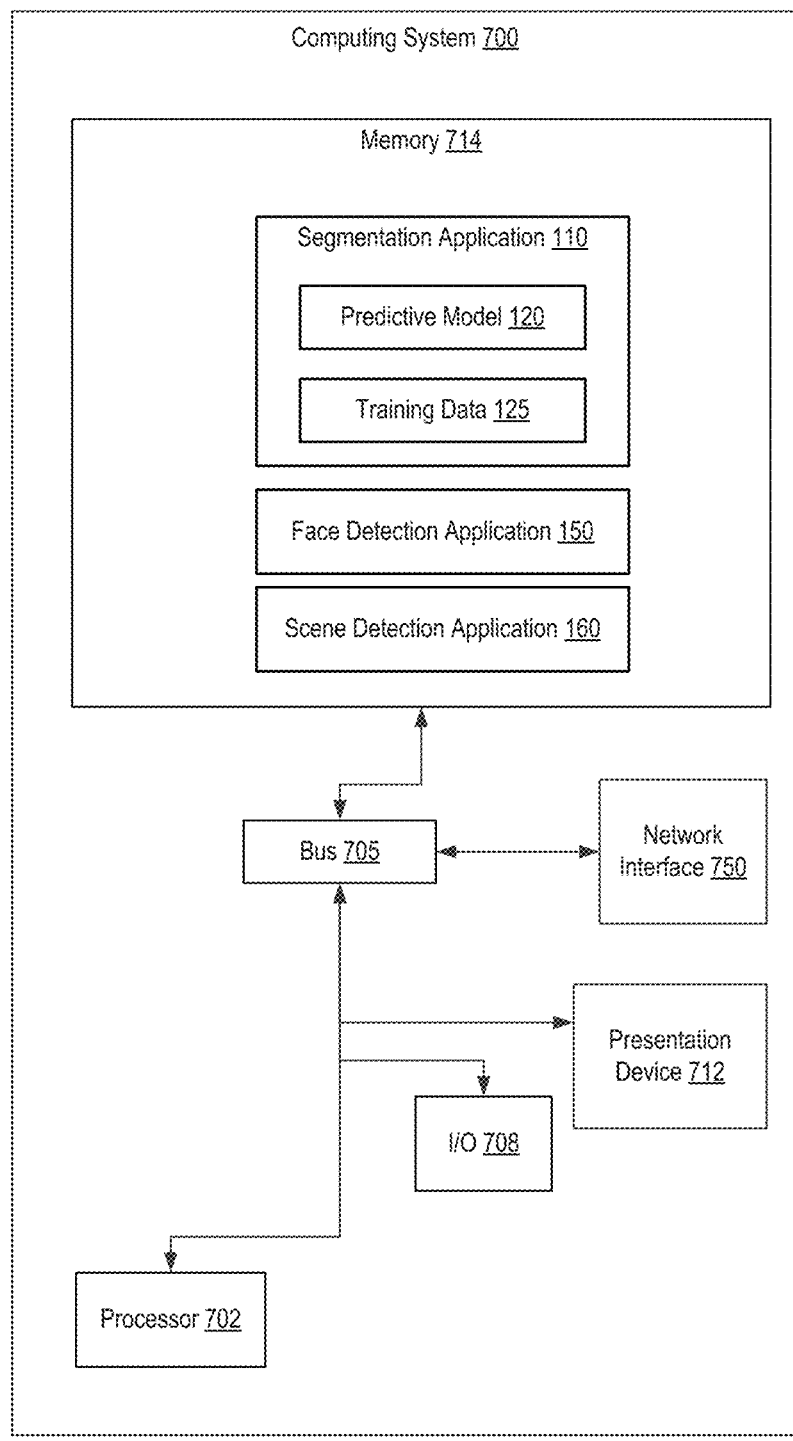
FIG. 7 depicts an example of a computing system for performing video segmentation, according to certain embodiments of the present disclosure.

FIG. 7 depicts an example of a computing system for performing video segmentation, according to certain embodiments of the present disclosure. Some of the components of the computing system 700 can belong to the computing system 101 of FIG. 1. For example, the segmentation application 110, face detection application 150, or scene detection application 160 may operate on the computing system 700. The computing system 700 includes one or more processors 702 communicatively coupled to one or more memory devices 714. The processor 702 executes computer-executable program code, which can be in the form of non-transitory computer-executable instructions, stored in the memory device 714, accesses information stored in the memory device 714, or both. Examples of the processor 702 include a microprocessor, an application-specific integrated circuit ("ASIC"), a field-programmable gate array ("FPGA"), or any other suitable processing device. The processor 702 can include any number of processing devices, including one.

The memory device 714 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices such as input or output devices. For example, the computing system 700 is shown with an input/output ("I/O") interface 708 that can receive input from input devices or provide output to output devices. A bus 705 can also be included in the computing system 700. The bus 705 can communicatively couple one or more components of the computing system 700 and allow for communication between such components.

The computing system 700 executes program code that configures the processor 702 to perform one or more of the operations described above with respect to FIGS. 1-6. The program code of the segmentation application 110, face detection application 150, and scene detection application 160, which can be in the form of non-transitory computer-executable instructions, can be resident in the memory device 714 or any suitable computer-readable medium and can be executed by the processor 702 or any other one or more suitable processor(s). Execution of such program code configures or causes the processor(s) to perform the operations described herein with respect to the computing system 101. In additional or alternative embodiments, the program code described above can be stored in one or more memory devices accessible by the computing system 700 from a remote storage device via a data network. The computing system 101 and any processes can use the memory device 714. The memory device 714 can store, for example, additional programs, or data such as training data 125 used by the applications executing on the processor 702 such as the segmentation application 110 including the predictive model 120 and training data 125, face detection application 150, scene detection application 160.

The computing system 700 also includes a network interface 710. The network interface 710 includes any device or group of devices suitable for establishing a wired or wireless data connection to one or more data networks. Non-limiting examples of the network interface 710 include an Ethernet network adapter, a modem, and/or the like. The computing system 101 is able to communicate with one or more other computing devices or computer-readable data sources via a data network using the network interface 710.

The computing system 700 includes a presentation device 712. A presentation device 712 can include any device or group of devices suitable for providing visual, auditory, or other suitable sensory output. Non-limiting examples of the presentation device 712 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that, throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for segmenting video, the method performed by a computing system and comprising:
   receiving a video comprising a plurality of video frames;
   calculating, with a predictive model trained to evaluate quality of an input video frame, a first aesthetic score for a first video frame from the plurality of video frames and a second aesthetic score for a second video frame from the plurality of video frames;
   determining that (i) the first aesthetic score and the second aesthetic score differ by a quality threshold and (ii) a number of frames between the first video frame and the second video frame exceeds a duration threshold; and
   creating a video segment by merging a subset of video frames from the plurality of video frames, the subset of video frames ranging from the first video frame to an segment-end frame preceding the second video frame.

2. The computer-implemented method of claim 1, further comprising:
   calculating, for each of the plurality of video frames, a facial identity of a face depicted in the respective video frame;
   determining that a third video frame of the plurality of video frames and a fourth video frame of the plurality of video frames have an identical facial identity;
   merging the third video frame and the fourth video frame into a face- detected video segment comprising a facial identity;
   determining that the face-detected video segment and the video segment have (i) a number of frames less than a second duration threshold, (ii) the same an identical facial identity, or (iii) aesthetic scores within an aesthetic score threshold; and
   responsive to determining that the video segment and the face-detected video segment overlap, creating a combined segment by merging the face-detected video segment and the video segment.

3. The computer-implemented method of claim 2, further comprising:
   calculating, for each of the plurality of video frames, a histogram comprising a distribution of color frequency in the respective video frame;
   determining that a fifth video frame of the plurality of video frames and a sixth video frame of the plurality of video frames have histogram scores that differ by more than a histogram threshold;
   creating a scene-detected video segment by merging a subset of video frames from the plurality of video frames, the subset of video frames ranging from the fifth video frame to an second segment-end frame preceding the sixth video frame; and
   responsive to determining that the scene-detected video segment and the combined segment overlap, merging the scene-detected video segment with the video segment.

4. The computer-implemented method of claim 1, further comprising:
   receiving a training image and a training label indicating an aesthetic score determined by a human; and
   training the predictive model by providing the training image and the aesthetic score to the predictive model.

5. computer-implemented method of claim 4, wherein the first aesthetic score and the second aesthetic score each comprises a component that is a measure of (i) color harmony, (ii) a balance of elements in a frame, (iii) whether content is interesting, (iv) depth of field, (v) whether light in a scene is interesting, (vi) which object is an emphasis of a scene, (vii) whether there is repetition, (viii) a rule of thirds, (ix) vivid colors, or (x) symmetry.

6. The computer-implemented method of claim 1, further comprising providing the video segment to a user interface.

7. The computer-implemented method of claim 1, further comprising:

determining an average aesthetic score for the video segment by averaging the aesthetic scores for all of the video frames in the video segment;
identifying, the video segment as a summary segment by determining that the video segment has an average aesthetic score greater than a sixth threshold; and
providing the summary segment to a user interface.

8. A system comprising:
a non-transitory computer-readable medium storing computer-executable program instructions for segmenting video; and
a processing device communicatively coupled to the non-transitory computer-readable medium for executing the computer-executable program instructions, wherein executing the computer-executable program instructions configures the processing device to perform operations comprising:
receiving a video comprising a plurality of video frames;
calculating, with a predictive model trained to evaluate quality of an input video frame, a first aesthetic score for a first video frame from the plurality of video frames and a second aesthetic score for a second video frame from the plurality of video frames, wherein the predictive model is trained to predict aesthetic scores for video frames by receiving a plurality of images comprising training la bels indicating aesthetic scores determined by a human;
determining that the first aesthetic score and the second aesthetic score differ by a quality threshold; and
creating a video segment by merging a subset of video frames from the plurality of video frames, the subset of video frames including the first video frame and an segment-end frame preceding the second video frame.

9. The system of claim 8, wherein creating the video segment is performed responsive to determining that a number of frames between the first video frame and the second video frame exceeds a duration threshold.

10. The system of claim 8, wherein the program instructions further configure the processing device to perform operations comprising:
calculating, for each of the plurality of video frames, a facial identity of a face depicted in the respective video frame;
determining that a third video frame of the plurality of video frames and a fourth video frame of the plurality of video frames have an identical facial identity;
merging the third video frame and the fourth video frame into a face-detected video segment comprising a facial identity;
determining that the face-detected video segment and the video segment have (i) a number of frames less than a second duration threshold, (ii) the same an identical facial identity, or (iii) aesthetic scores within an aesthetic score threshold; and
responsive to determining that the video segment and the face-detected video segment overlap, creating a combined segment by merging the face-detected video segment and the video segment.

11. The system of claim 10, wherein the program instructions further configure the processing device to perform operations comprising:
determining a first average aesthetic score for the face-detected video segment and a second average aesthetic score for the video segment; and
responsive to determining that the first average aesthetic score and the second aesthetic score are within an average aesthetic score threshold, combining the face-detected video segment with the video segment.

12. The system of claim 10, wherein the program instructions further configure the processing device to perform operations comprising:
responsive to determining that the video segment and the face-detected video segment overlap, creating a combined segment by merging the face-detected video segment and the video segment;
calculating, for each of the plurality of video frames, a histogram comprising a distribution of color frequency in the respective video frame;
determining that a fifth video frame of the plurality of video frames and a sixth video frame of the plurality of video frames have histogram scores that differ by more than a histogram threshold;
creating a scene-detected video segment by merging a subset of video frames from the plurality of video frames, the subset of video frames ranging from the fifth video frame to an second segment-end frame preceding the sixth video frame; and
responsive to determining that the scene-detected video segment and the combined segment overlap, merging the scene-detected video segment with the video segment.

13. The system of claim 11, wherein the first aesthetic score and the second aesthetic score each comprises a component that is a measure of (i) color harmony, (ii) a balance of elements in a frame, (iii) whether content is interesting, (iv) depth of field, (v) whether light in a scene is interesting, (vi) which object is an emphasis of a scene, (vii) whether there is repetition, (viii) a rule of thirds, (ix) vivid colors, or (x) symmetry.

14. The system of claim 10, wherein the program instructions further configure the processing device to perform operations comprising:
determining an average aesthetic score for the video segment by averaging the aesthetic scores for all of the video frames in the video segment;
identifying, the video segment as a summary segment by determining that the video segment has an average aesthetic score greater than a sixth threshold; and
providing the summary segment to a user interface.

15. A non-transitory computer-readable storage medium storing computer-executable program instructions for segmenting video, wherein when executed by a processing device, the computer-executable program instructions cause the processing device to perform operations comprising:
a step for receiving a video comprising a plurality of video frames;
a step for calculating, with a predictive model trained to evaluate quality of an input video frame, a first aesthetic score for a first video frame from the plurality of video frames and a second aesthetic score for a second video frame from the plurality of video frames;
a step for determining that (i) the first aesthetic score and the second aesthetic score differ by a quality threshold and (ii) a number of frames between the first video frame and the second video frame exceeds a duration threshold; and
a step for creating a video segment by merging a subset of video frames from the plurality of video frames, the subset of video frames ranging from the first video frame to an segment -end frame preceding the second video frame.

16. The non-transitory computer-readable storage medium of claim 15, wherein the computer-executable program instructions further cause the processing device to perform operations comprising:
- a step for calculating, for each of the plurality of video frames, a facial identity of a face depicted in the respective video frame;
- a step for determining that a third video frame of the plurality of video frames and a fourth video frame of the plurality of video frames have an identical facial identity;
- a step for merging the third video frame and the fourth video frame into a face-detected video segment comprising a facial identity;
- a step for determining that the face-detected video segment and the video segment have (i) a number of frames less than a second duration threshold, (ii) the same an identical facial identity, or (iii) aesthetic scores within an aesthetic score threshold; and
- a step for responsive to determining that the video segment and the face-detected video segment overlap, creating a combined segment by merging the face-detected video segment and the video segment.

17. The non-transitory computer-readable storage medium of claim 16, wherein the computer-executable program instructions further cause the processing device to perform operations comprising:
- a step for calculating, for each of the plurality of video frames, a histogram comprising a distribution of color frequency in the respective video frame;
- a step for determining that a fifth video frame of the plurality of video frames and a sixth video frame of the plurality of video frames have histogram scores that differ by more than a histogram threshold;
- a step for creating a scene-detected video segment by merging a subset of video frames from the plurality of video frames, the subset of video frames ranging from the fifth video frame to an second segment-end frame preceding the sixth video frame; and
- a step for responsive to determining that the scene-detected video segment and the combined segment overlap, merging the scene-detected video segment with the video segment.

18. The non-transitory computer-readable storage medium of claim 15, wherein the computer-executable program instructions further cause the processing device to perform operations comprising:
- a step for receiving a training image and a training label indicating an aesthetic score determined by a human; and
- a step for training the predictive model by providing the training image and the aesthetic score to the predictive model.

19. The non-transitory computer-readable storage medium of claim 18, wherein the first aesthetic score and the second aesthetic score each comprises a component that is a measure of (i) color harmony, (ii) a balance of elements in a frame, (iii) whether content is interesting, (iv) depth of field, (v) whether light in a scene is interesting, (vi) which object is an emphasis of a scene, (vii) whether there is repetition, (viii) a rule of thirds, (ix) vivid colors, or (x) symmetry.

20. The computer-readable storage medium of claim 15, wherein the instructions further cause the processing device to perform operations comprising:
- a step for determining an average aesthetic score for the video segment by averaging the aesthetic scores for all of the video frames in the video segment;
- a step for identifying, the segment as a summary segment by determining that the video segment has an average aesthetic score greater than a sixth threshold; and
- a step for providing the summary segment to a user interface.

* * * * *